United States Patent
Subramanian et al.

(10) Patent No.: US 9,674,669 B2
(45) Date of Patent: Jun. 6, 2017

(54) DETERMINING AND NAVIGATING TO A TARGET LOCATION

(71) Applicant: Citrix Systems, Inc., Fort Lauderdale, FL (US)

(72) Inventors: Navaneetha Subramanian, Fremont, CA (US); Timmi Thomas, Fremont, CA (US); Shaunak Mistry, Scotts Valley, CA (US); Suresh Mathew John, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/690,594

(22) Filed: Apr. 20, 2015

(65) Prior Publication Data
US 2016/0309304 A1 Oct. 20, 2016

(51) Int. Cl.
*H04W 4/04* (2009.01)
*H04W 4/00* (2009.01)

(52) U.S. Cl.
CPC ............ *H04W 4/04* (2013.01); *H04W 4/008* (2013.01)

(58) Field of Classification Search
CPC ......... H04W 4/04; H04W 4/02; H04W 4/021; H04W 64/003; H04W 40/20; H04W 4/008; H04W 4/206; H04W 88/08; G01C 21/206; G01C 21/20; G06F 2221/2111
See application file for complete search history.

(56) References Cited

U.S. PATENT DOCUMENTS

| | | | |
|---|---|---|---|
| 2008/0275590 A1* | 11/2008 | Ross | A61M 5/1483 700/228 |
| 2010/0121567 A1* | 5/2010 | Mendelson | G01C 21/206 701/467 |
| 2010/0235091 A1* | 9/2010 | Das | G01C 21/3602 701/532 |
| 2011/0081918 A1* | 4/2011 | Burdo | G01C 21/20 455/456.1 |
| 2012/0116670 A1* | 5/2012 | Rosekrans | G01C 21/3469 701/426 |
| 2012/0221174 A1* | 8/2012 | Daly | G05D 1/0289 701/2 |
| 2013/0246526 A1* | 9/2013 | Wu | G06Q 10/109 709/204 |
| 2013/0261964 A1* | 10/2013 | Goldman | G01C 21/12 701/500 |

(Continued)

OTHER PUBLICATIONS

"WhatsApp Home page," WhatsApp, retrieved Apr. 6, 2015, <https://www.whatsapp.com/>.
(Continued)

*Primary Examiner* — Nizar Sivji
(74) *Attorney, Agent, or Firm* — Banner & Witcoff, Ltd.

(57) ABSTRACT

Methods and systems for detecting the location of a target, such as an event or another device, and navigating a device to the target are described herein. The device may be located inside of a building, and the target may be located inside the same building (or a nearby building). The location of the device and/or the location of the target may be determined using, for example, short-range wireless sensors, such as Bluetooth (e.g., Bluetooth Low Energy) sensors, Near Field Communication sensors, or other indoor location sensors. The device may navigate a user of the device to the target location.

19 Claims, 21 Drawing Sheets

(56) References Cited

U.S. PATENT DOCUMENTS

| | | | | |
|---|---|---|---|---|
| 2014/0325368 A1* | 10/2014 | Cragun | ............... | G06F 3/0484 715/738 |
| 2014/0343978 A1* | 11/2014 | Bisht | ................... | G06Q 10/109 705/5 |
| 2015/0018011 A1* | 1/2015 | Mendelson | .......... | G01C 21/206 455/456.3 |
| 2015/0079942 A1* | 3/2015 | Kostka | ............... | G06Q 30/0633 455/411 |
| 2016/0223339 A1* | 8/2016 | Pellow | ................ | G01C 21/206 |

OTHER PUBLICATIONS

"Check-ins—Help Center," Foursquare, retrieved Mar. 13, 2015, <https://support.foursquare.com/hc/en-us/articles/201065340-Check-ins>.

"Demo—Indoor Navigation," insoft, 2015, <https://www.insoft.co.uk/Products/Indoor-Navigation/Demo>.

"Estimate Indoor Location," Estimote, retrieved Mar. 13, 2015, <http://estimote.com/indoor/>.

"Features," indoors, 2014, <http://indoo.rs/imprint/>.

"Functionality—Indoor Navigation," insoft, 2015, <https://www.insoft.co.uk/Products/Indoor-Navigation/Functionality>.

"Google Developers," Google, retrieved Apr. 6, 2015, <https://developers.google.com/maps/>.

"iBeacon (indoor) navigation platform and app," LabWerk, retrieved on Mar. 13, 2015, <http://labwerk.com/portfolio/indoor-navigation/>.

"iBeacon for Developers," Apple Developer, retrieved Mar. 13, 2015, <https://developer.apple.com/ibeacon/>.

"Indoo.rs product description," Bernd Gruber, indoo.rs, Jan. 8, 2014.

"Overview—Indoor Navigation," insoft, 2015, <https://www.insoft.co.uk/Products/Indoor-Navigation>.

"Maps Editor // 1. Create Location," YouTube, Jul. 19, 2013, <https://youtube.com/watch?v=OuLXrLob6PA&list=PLAZPpHUGY-Dn0Uxd2Nu290u7_2rKDWwFN&index=1>.

"Maps Editor // 2. Upload Floor Plan," YouTube, Jul. 19, 2013, <https://youtube.com/watch?v=qws_x9QAEHE&index=2&list=PLAZPpHUGY-DnOUxd2Nu290u7_2rKDWwFN>.

"Maps Editor // 3. Create Map," YouTube, Jul. 19, 2013, <https://youtube.com/watch?v=L0s544iBUe8&index=3&list=PLAZPpHUGY-Dn0Uxd2Nu290u7_2rKDWwFN>.

"Maps Editor // 4. Setup POIs," YouTube, Jul. 19, 2013, <https://youtube.com/watch?v=fsjBaeCki2Q&list=PLAZPpHUGY-Dn0Uxd2Nu290u7_2rKDWwFN>.

"Maps Editor // 5. Define Routes," YouTube, Jul. 19, 2013, <https://youtube.com/watch?v=SH-_wP3EjjY&list=PLAZPpHUGY-DnOUxd2Nu290u7_2rKDWwFN&index=5>.

"Maps Editor // 6. Publish Location," YouTube, Jul. 19, 2013, <https://youtube.com/watch?v=DyDrrDyTnMg&index=6&list=PLAZPpHUGY-DnOUxd2Nu290u7_2rKDWwFN>.

"Local and Remote Notification Programming Guide," Apple Inc., Mar. 9, 2015.

"Setup—Indoor Navigation," insoft, 2015, <https://www.insoft.co.uk/Products/Indoor-Navigation/Setup>.

"What are check-Ins?," Yelp, retrieved Mar. 13, 2015, <http://www.yelp-support.com/article/What-are-Check-Ins?I=en_US>.

\* cited by examiner

1400

Device 1

6:07
Monday, March 23

Message now     1405
Development Meeting will start in 15 Minutes
slide to view

Device 1 📶　　　4:20 PM　　　✈ ✱ 🔋

< Mon, Nov 17　Event Details

Development Meeting

| Where | Conference Room 1 > | 1605 |

| When | Monday, Nov 17 2020 > | 1610 |
| | 11:00 AM to 11:30 AM | |

| Organizer | Jane Doe > | 1615 |

| Attendees | 8 attendees > | 1620 |

 1630    1635

Join Meeting　Navigate　Running Late　Invite User

When: Occurs every Monday, Tuesday, Wednesday and Thursday from 11:00 AM to 11:30 AM effective 7/10/2020 until 1/1/2022. (UTC-8:00) Pacific Time (U.S. & Canada)

Where: Conference Room 1

DETERMINING AND NAVIGATING TO A TARGET LOCATION

FIELD

Aspects described herein generally relate to computer networking, remote access, and location detection. More specifically, aspects described herein relate to detecting the location of a target, such as an event or another device, and navigating a device to the target.

BACKGROUND

Users, such as employees of a company, may be unfamiliar with an indoor location they rarely visit, such as a new office building or a nearby office building. For example, the company may have offices across the world. An employee who visits another office may have difficulty finding the location of a meeting or finding another employee because the employee is unfamiliar with the new office. The employee may waste a significant amount of time making phone calls, looking at a physical map at the entrance of the building, and/or running around to find the meeting location or the other employee.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for receiving (e.g., at a user device) a selection of a target within a building. The location of the target within the building may be determined from among a plurality of discrete locations within the building. A location of the user device (or other device) within the building may also be determined based on one or more location sensors, such as Bluetooth sensors or Near Field Communication sensors. Determining the location of the target within the building may also be based on one or more location sensors. The method may comprise determining a navigation path within the building from the location of the user device to the location of the target. A display of the navigation path within the building from the location of the user device to the location of the target may be generated for display on the user device.

In some aspects, the target may comprise an event. Determining the location of the event may comprise accessing a calendar service comprising information for the event and determining, as the location of the event, a location identified in the information for the event.

The method may comprise receiving, at the user device, an invitation from a second user device for a user of the user device to go to the location of the target. Receiving the invitation may occur prior to receiving the selection of the target. The invitation, including an option to select the target, may be displayed at the user device, and the selection of the target may comprise a selection of the option. The target may comprise a second user of the second user device, and the location of the target may comprise a location of the second user device. In this example, determining the location of the target may comprise determining the location of the second user device. Alternatively, the target may comprise an event, and the location of the target may comprise the location of the event. In this example, determining the location of the event may comprise accessing a calendar service comprising information for the event, and determining, as the location of the event, a location identified in the information for the event.

If the target comprises an event, the method may comprise receiving, at the user device, a notification of the event, prior to receiving the selection of the event. The notification may be received a predetermined amount of time prior to a start time of the event. The method may comprise displaying, at the user device, the notification of the event, including an option to select the event. The selection of the event may comprise a selection of the option.

If the target comprises a second user of a second user device, the method may comprise sending, by the user device, a request for the location of the second user device prior to receiving the selection of the second user. The method may also comprise receiving, from the second user device, an authorization message to share the location of the second user device. The receiving the selection of the second user previously described may be performed in response to receiving the authorization message to share the location of the second user device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 14 illustrates an example display screen for displaying an event notification in accordance with one or more illustrative aspects described herein.

FIG. 16 illustrates an example display screen for displaying details for an event in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards detecting the location of a target, such as an event or another device, and navigating a device to the target. The device may be located inside of a building, and the target may be located inside the same building (or a nearby building). The location of the device and/or the location of the target may be determined using, for example, short-range wireless sensors, such as Bluetooth (e.g., Bluetooth Low Energy) sensors, Near Field Communication sensors, or other indoor location sensors. The device may navigate a user of the device to the target location.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
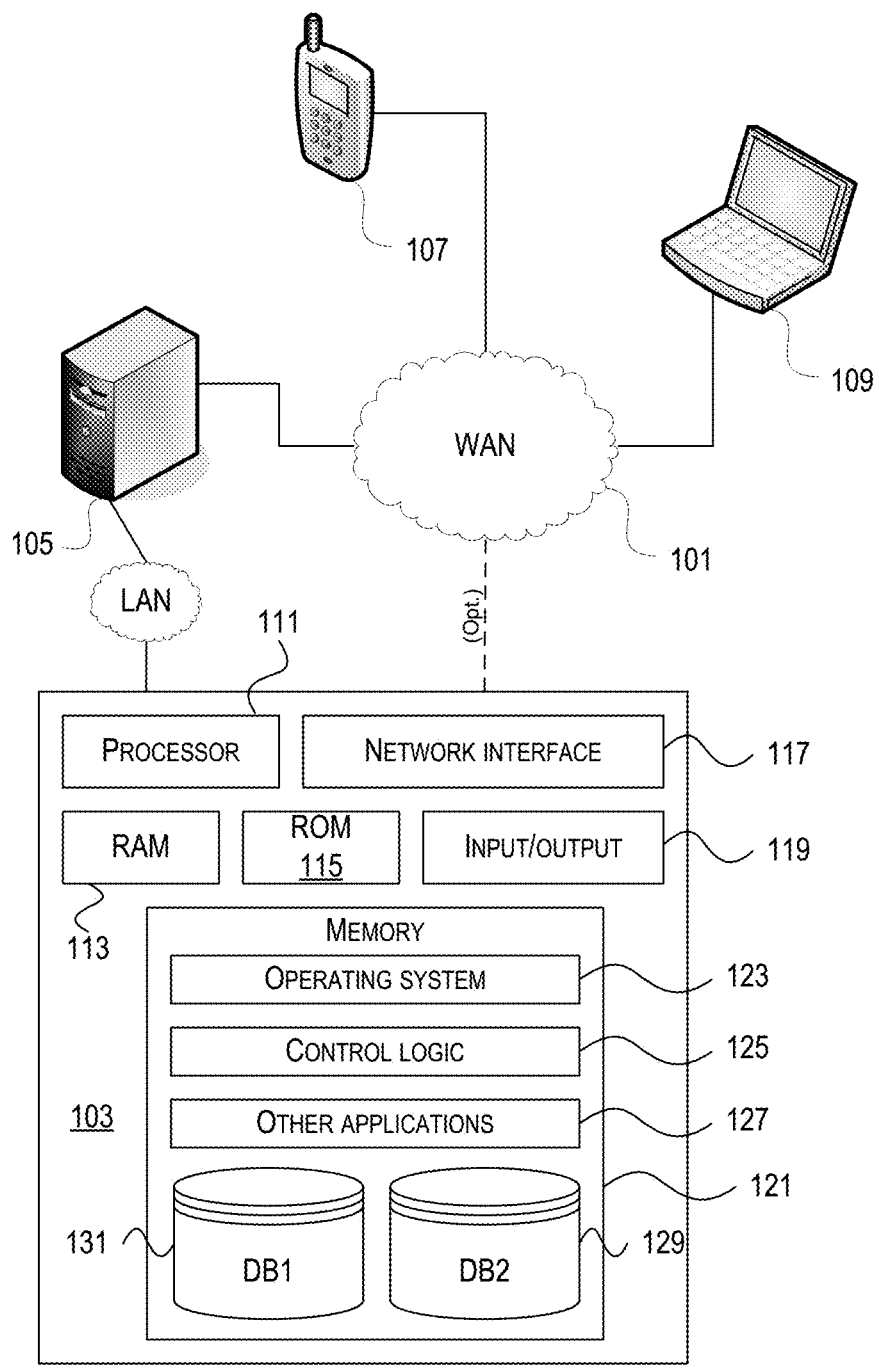
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
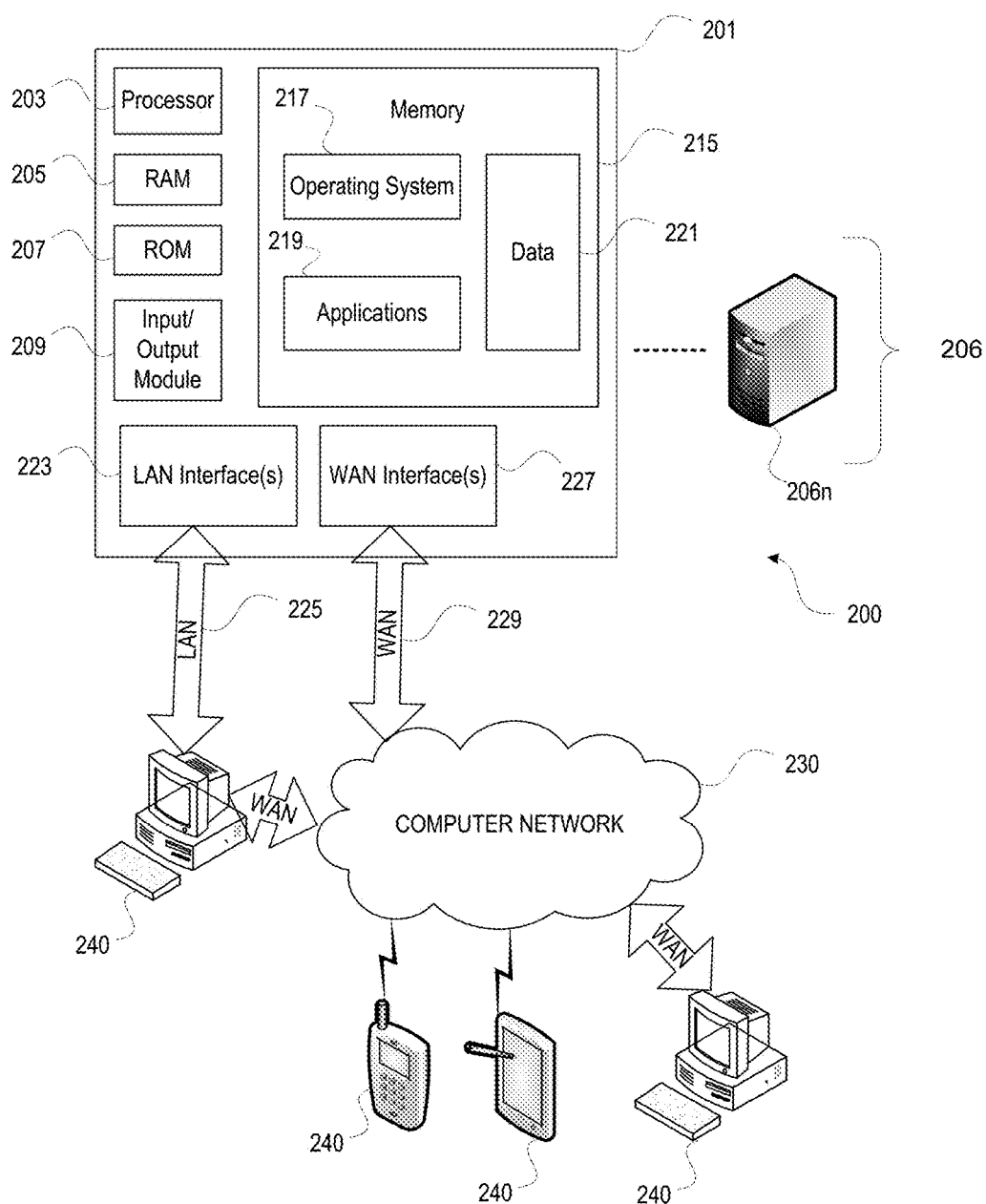
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
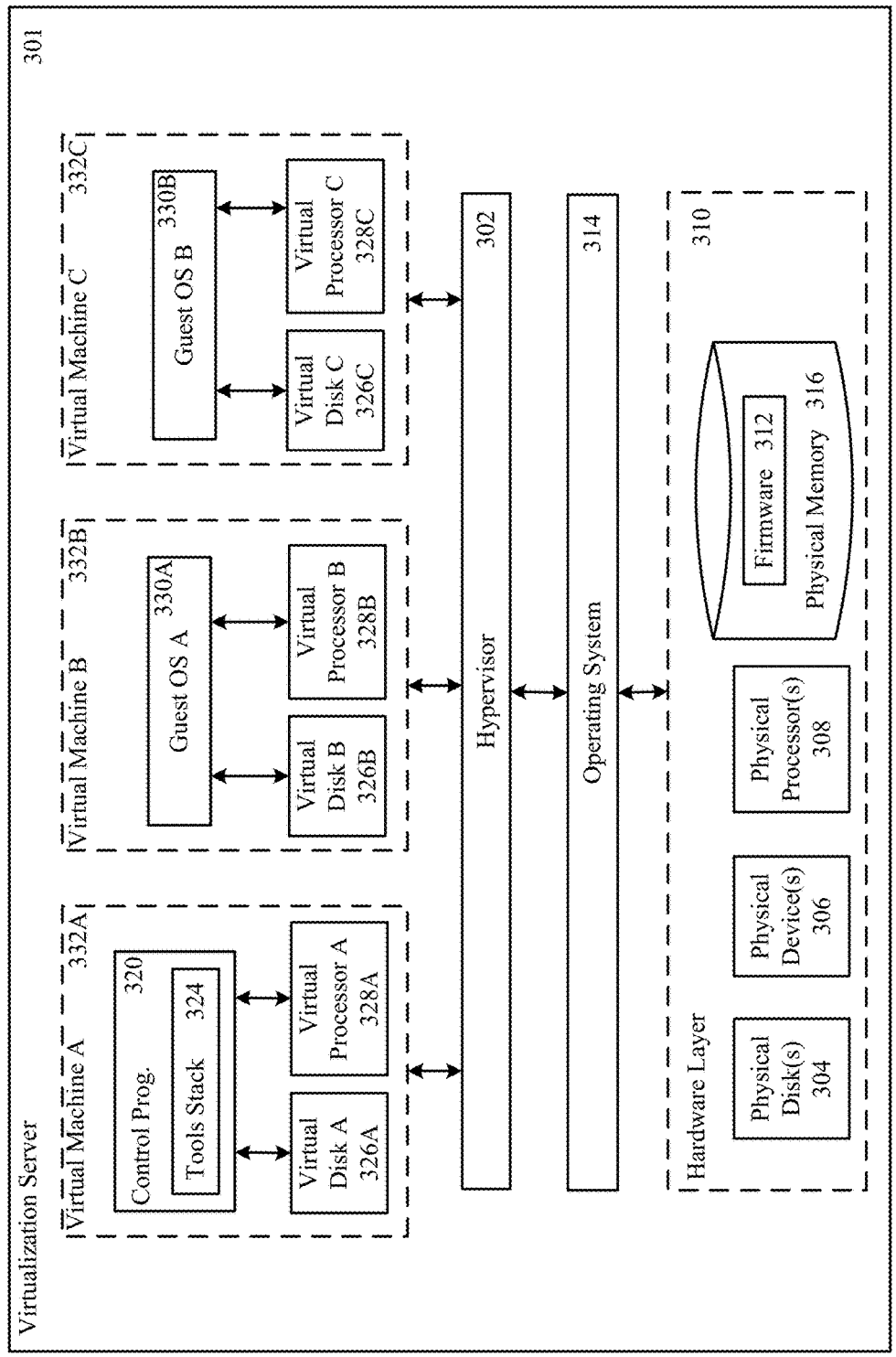
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
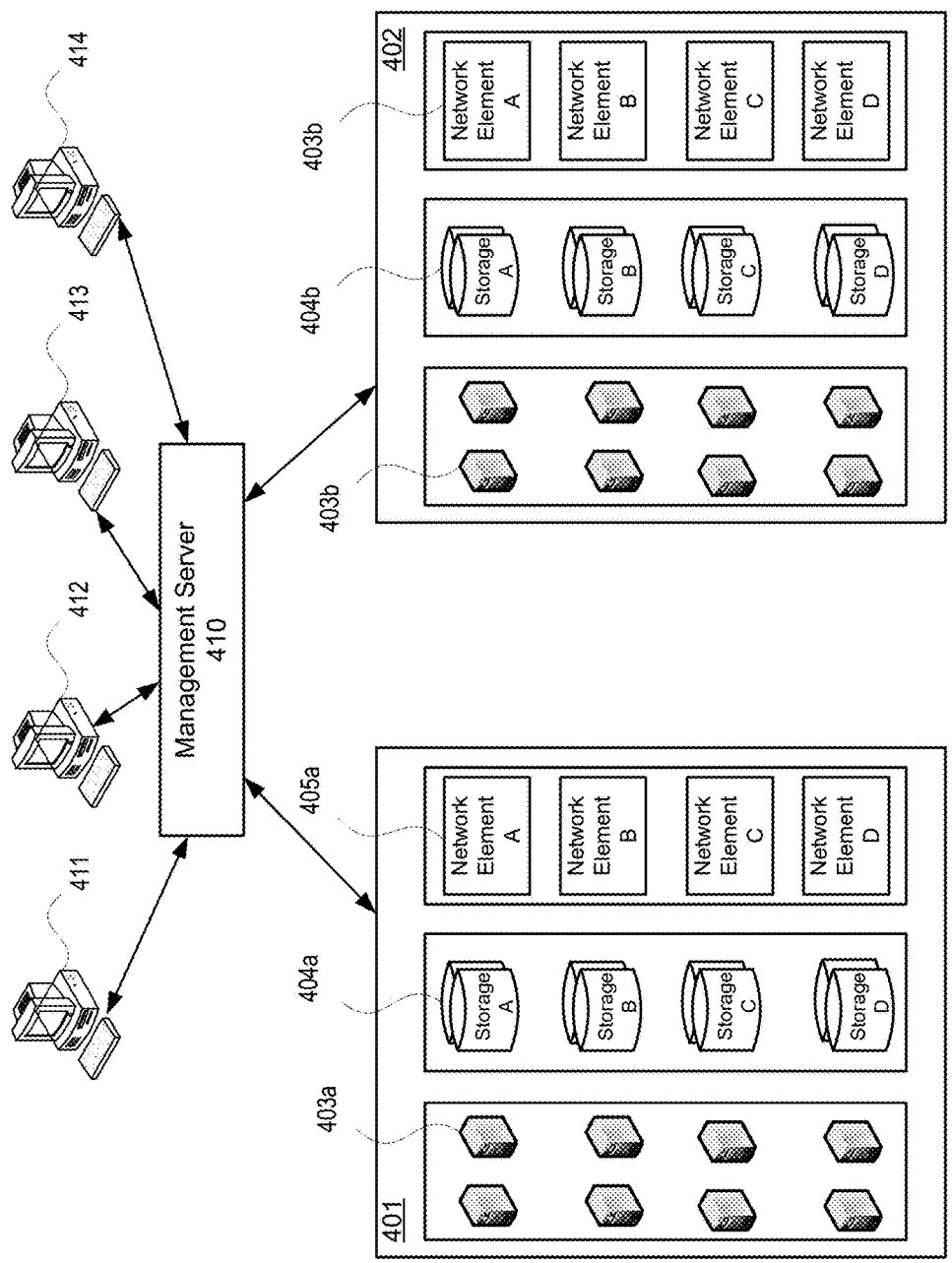
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
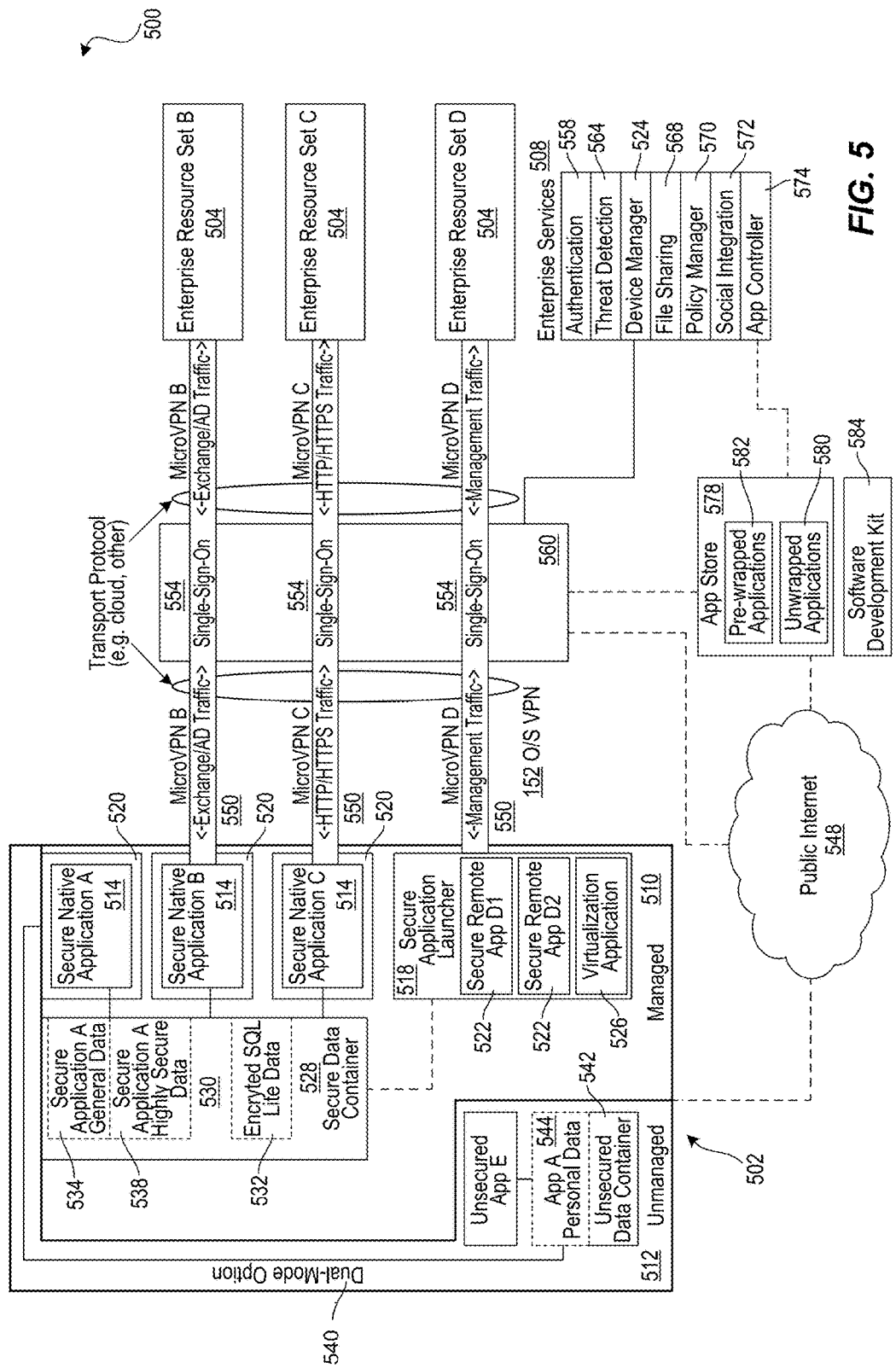
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
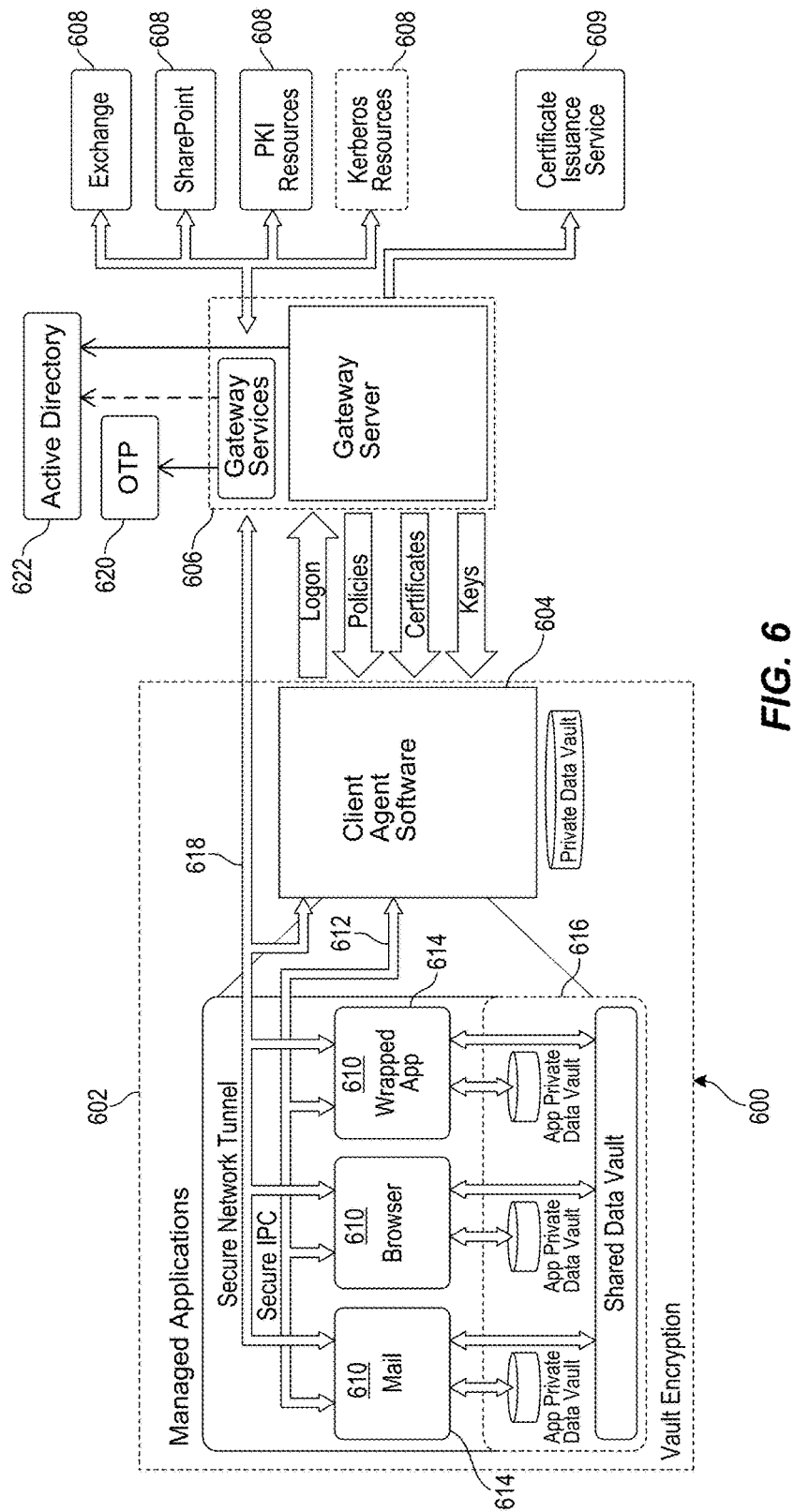
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Determining the Location of a Target and Navigating to the Target

Figure 7:
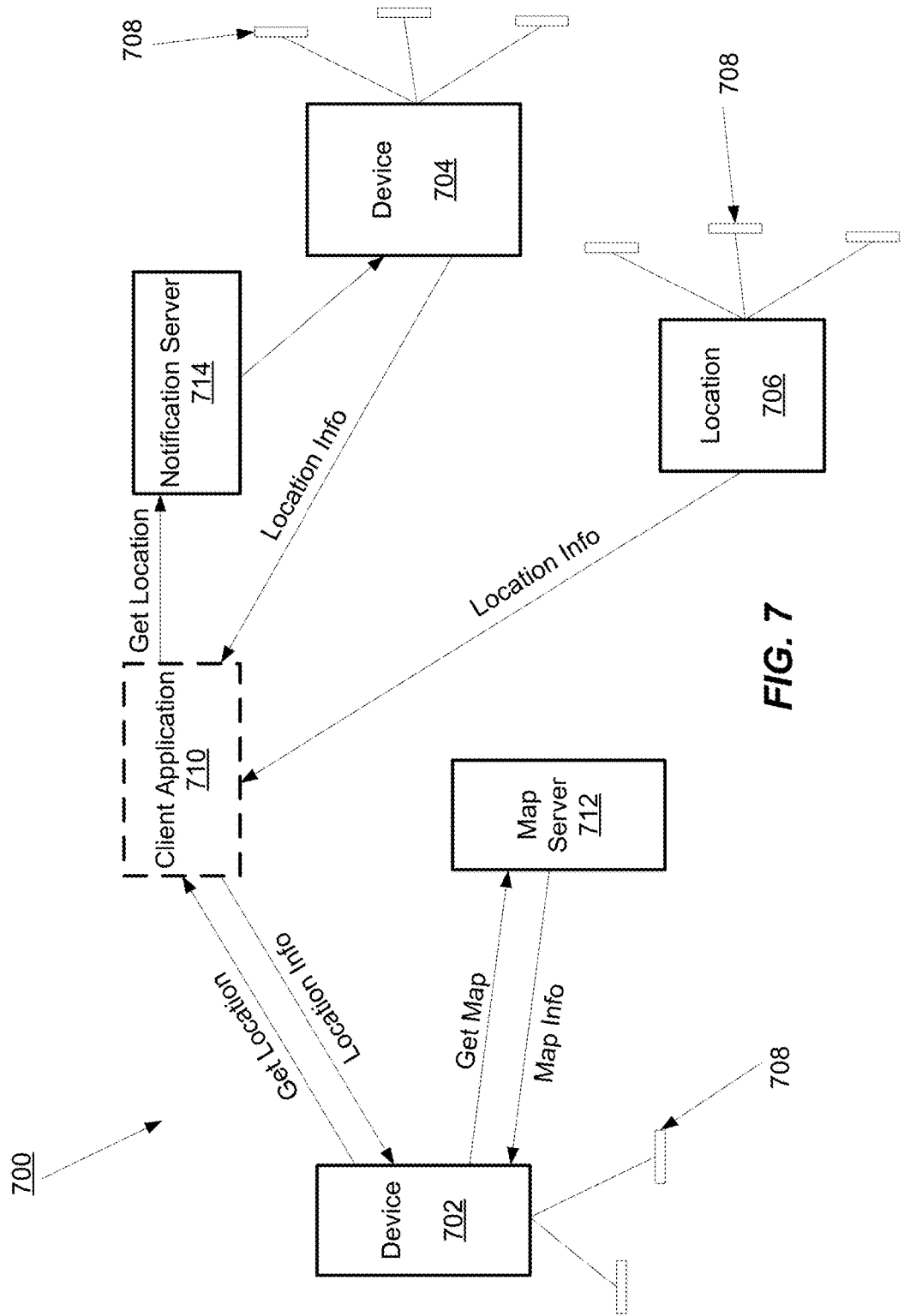
FIG. 7 depicts an illustrative system for location detection and navigation in accordance with one or more illustrative aspects described herein.

FIG. 7 depicts an illustrative system 700 for location detection and navigation in accordance with one or more illustrative aspects described herein. The system 700 may include one or more user devices, such as a first device 702 and a second device 704. Each of the user devices 702 and 704 may comprise any of the client devices previously described, such as terminals 240, client computers 411-414, mobile device 502, or mobile device 602. Each of the user devices 702 and 704 may also include a client application 710, such as the client agent 604 or any other managed and/or trusted application. For example, the application 710 may comprise a messaging or a calendar application used to send messages to other devices or manage a user's schedule. The system 700 may include one or more indoor locations 706, which may be inside of a building, such as an office building, a home, a retail building, convention center, a high rise building, etc. The location 706 may comprise a particular location within the building, such as a meeting or conference room, an office, a cubicle, a hallway, a bathroom, a reception desk, or any other location within the building whether or not separated by physical barriers, such as doors and walls.

The system may also include several location sensors 708 placed throughout the building. The location sensors 708 may comprise short-range wireless location sensors, such as Bluetooth (including Bluetooth Low Energy (BLE)), Near Field Communication (NFC), Radio-Frequency Identification (RFID), Infrared (IR), or any other indoor location sensors. The location sensors 708 may be used to determine the location of the devices 702 and 704 and the location 706 within the building. For example, the devices 702 and 704 or the location 706 may communicate with the location sensors 708 to determine their respective location.

The system 700 may also include a map server 712. The map server 712 may comprise any of the servers previously described, such as the computing device 201, server 206, virtualization server 301, management server 410, enterprise resources 504, enterprise services 508, access gateway 560, or gateway server 606. The map server 712 may store a plurality of maps (e.g., floor layouts) for one or more buildings having location sensors 708. The map server 712 may store layouts for each floor in the building. The map server 712 may also store navigation information for each building. The navigation information may include directions (e.g., go straight, turn left, turn right, etc.) for navigating from one point in the building to another. The navigation information may also include the distance between each point in the building, and the units may be in feet, meters, or any other metric for measuring distance. The navigation information may also include the estimated amount of time to walk between each point in the building. For example, the navigation information may identify the amount of time to walk from point A to point B. If the route includes multiple segments, the amount of time to walk each segment may be included in the map server 712. For example, a path from point A to point X may include these three segments: point A to point B, point B to point T, and point T to point X. The map server 712 may store the estimated amount of time for each of these segments. The map server 712 may also store, as the estimated amount of time to get from point A to point X, the sum of the amounts of time for the three segments. The navigation information may also include the amount of time to travel from one floor to another floor in the building. The amount of time between floors may be predetermined and added to the map server 712. For example, an administrator of the map server 712 may enter 2 minutes to travel from the first floor to the second floor via elevator (or 3 minutes via stairs), 3 minutes to travel from the first floor to the third floor via elevator (or 5 minutes via stairs), etc. The administrator may enter the amount of time for each combination of floors in the building for each method of travelling between floors (e.g., elevator, escalator, stairs, ramp, etc.).

The system 700 may include a notification server 714. The notification server may comprise any of the servers previously described, such as the computing device 201, server 206, virtualization server 301, management server 410, enterprise resources 504, enterprise services 508, access gateway 560, or gateway server 606. The notification server 714 may communicate with devices 702 and/or 704, such as via the client application 710 of each device. The notification server 714 may push notifications and other messages, such as calendar events, text messages, email messages, etc., to the devices 702 and/or 704. In some aspects, the devices 702 and/or 704 may also pull information from the notification server 714. The notification server 714 may comprise a device in the cloud.

Figure 8:
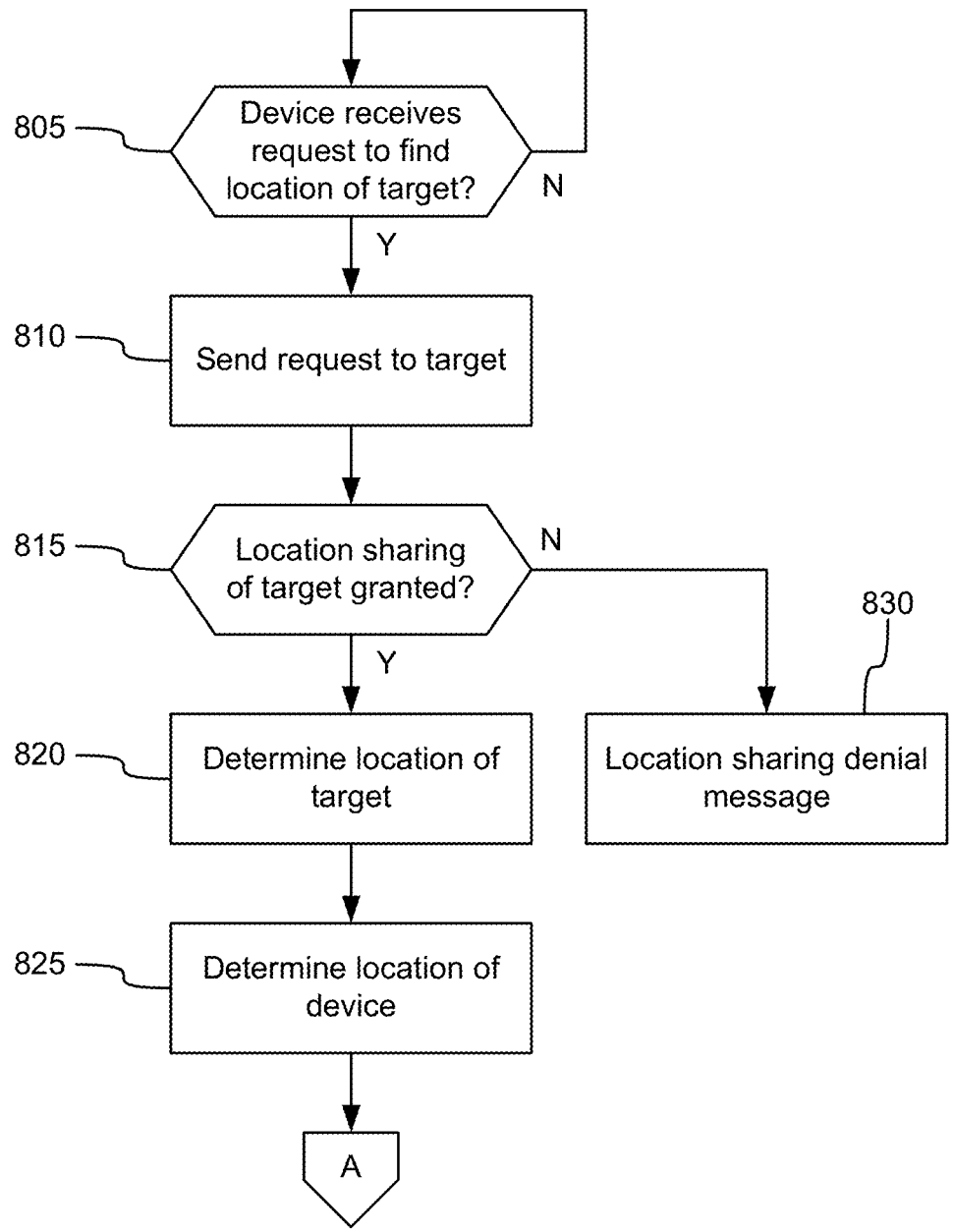
FIG. 8 illustrates an example method of sharing a target location with a device in accordance with one or more illustrative aspects described herein.

FIG. 8 illustrates an example method of sharing a target location with a device 702 in accordance with one or more illustrative aspects described herein. The target location may be the location of a second device 704 and/or the location of an event, such as a meeting. The method illustrated in FIG. 8 may provide a user of the device 702 a one-click option to request the location of a colleague and also assist the colleague in sharing his or her location. In step 805, the device 702 may wait to receive, from a user of the device 702, a request to find the location of a target, such as the location of the device 704 (which may be associated with the colleague). The client application 710 may generate a button (e.g., a touchscreen button or other button) for display on the device 702. The button may allow the user to request the location of the colleague or another contact.

Figure 9:
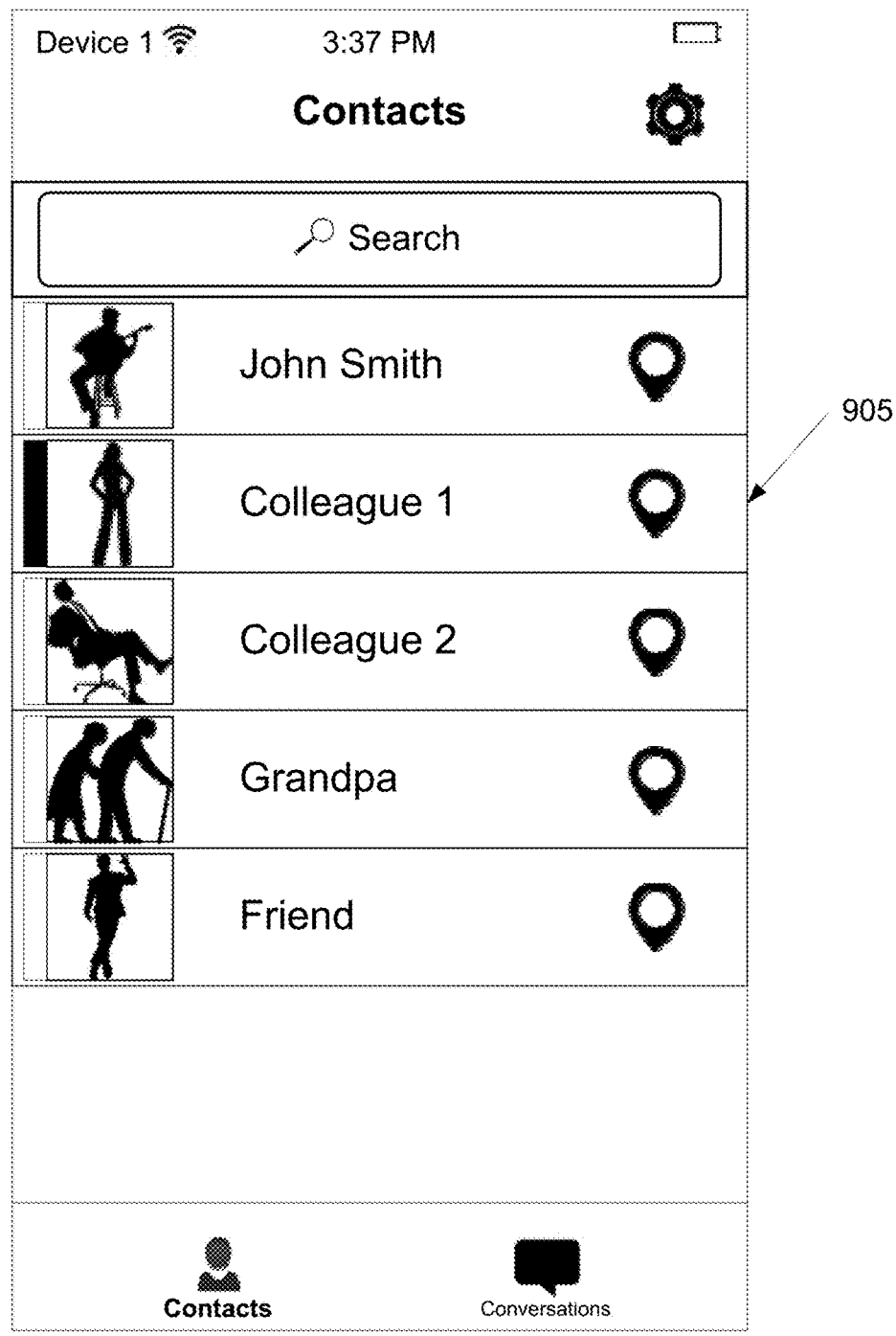
FIG. 9 illustrates an example display screen for displaying a list of contacts in accordance with one or more illustrative aspects described herein.

FIG. 9 illustrates an example display screen 900 for displaying a list of contacts in accordance with one or more illustrative aspects described herein. The user may select one of the contacts, such as Colleague 1 (identified by reference number 905). In some aspects, selecting Colleague 1 from the display screen 900 may cause the device 702 to send a request for the device 704 to share its location with the device 702. Selecting Colleague 1 may additionally or alternatively display more options for interacting with Colleague 1.

Figure 10:
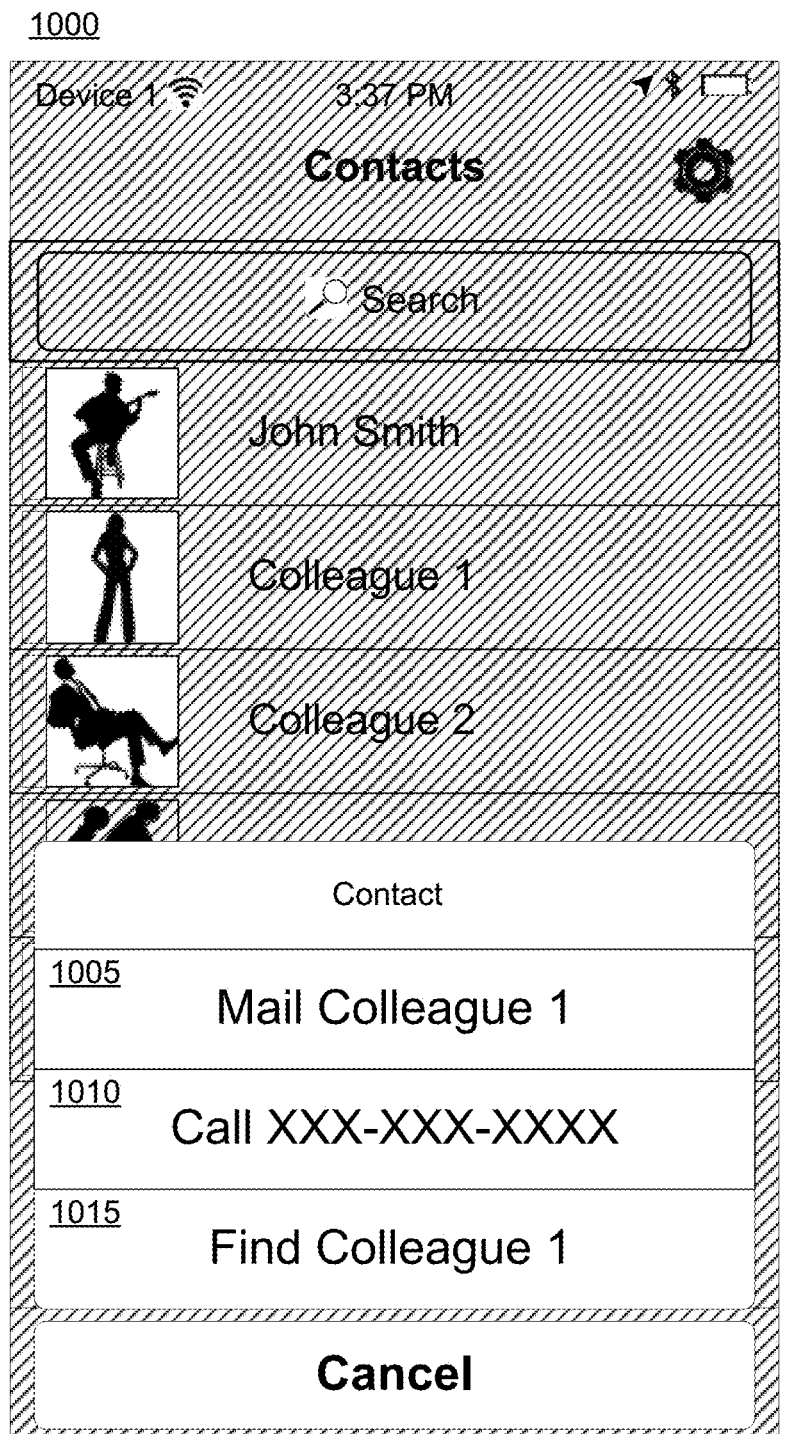
FIG. 10 illustrates an example display screen for displaying options for interacting with a contact in accordance with one or more illustrative aspects described herein.

FIG. 10 illustrates an example display screen 1000 for displaying options for interacting with a contact, such as Colleague 1, in accordance with one or more illustrative aspects described herein. Display screen 1000 may be displayed if the user selects Colleague 1 in display screen 900. The user may be presented with options to send an email to Colleague 1 (1005), call Colleague 1 from the device 702 (which may be a mobile phone) (1010), and/or find Colleague 1 (1015). The device 702 may determine that the user desires to find colleague 1 if the user selects the find option 1015.

Returning to FIG. 8, in step 810, the device 702 may send a request to the device 704 for the device 704 to share its location. The request may be sent in response to the user of the device 702 selecting one of the find colleague options illustrated in FIGS. 9 and 10. The device 702 may utilize the client application 710 to send the request, and the client application 710 may send the request to the notification server 714. The notification server 714 may forward the request to the device 704. For example, the notification server 714 may send a push notification to the device 704 or a client application of the device 704 (not illustrated). In response to receiving the request, the device 704 may display a prompt to the user of the device 704 for the user to share his or her location with the user of the device 702.

Figure 11:
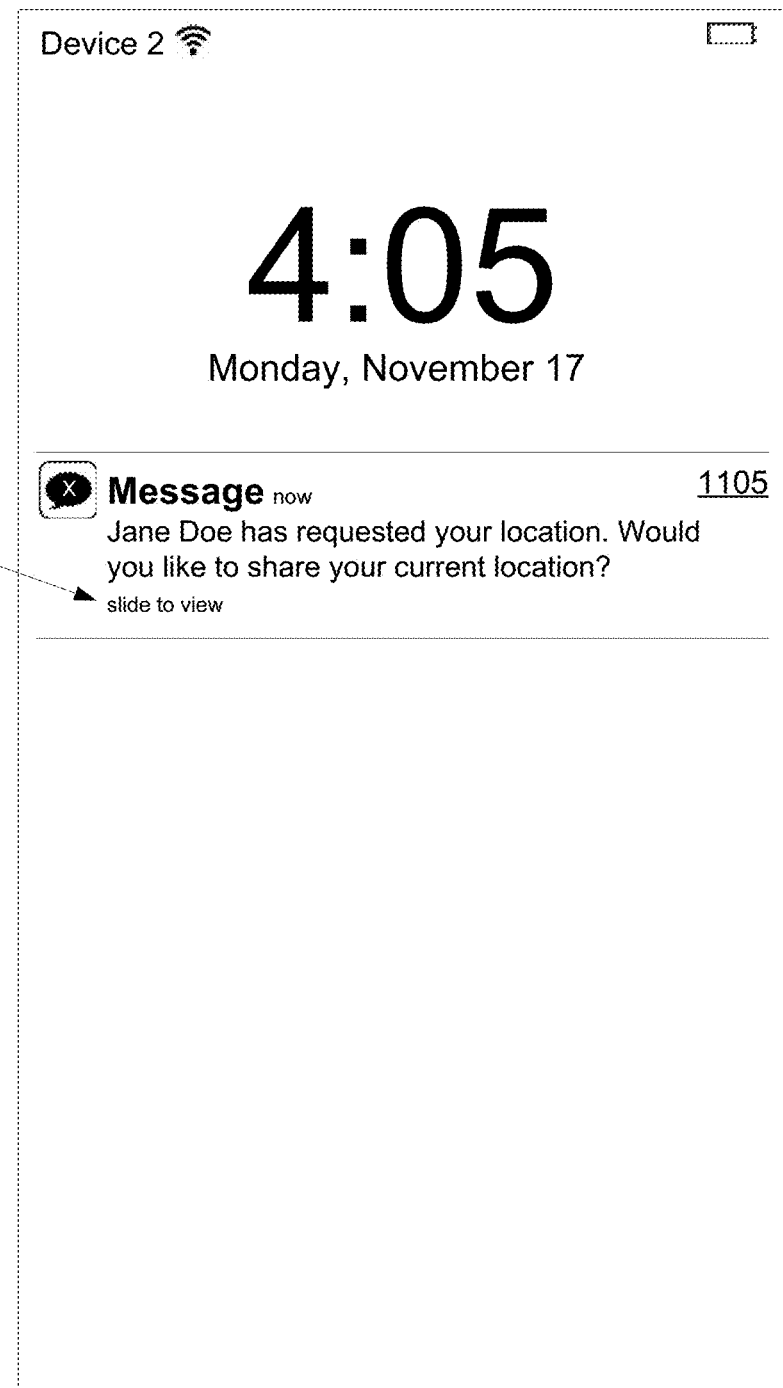
FIG. 11 illustrates an example display screen for requesting the location of a target in accordance with one or more illustrative aspects described herein.

FIG. 11 illustrates an example display screen 1100 for requesting the location of a target (e.g., the location of device 704) in accordance with one or more illustrative aspects described herein. The device 704 may display a message 1105 (e.g., a notification) requesting the user of the device 704 to grant the device 704 permission to share its location with the device 702. The message 1105 may identify the requester (e.g., an identifier for the device 702 or an identifier for the user of the device 702, such as Jane Doe). The message 1105 may comprise, for example, a text message, an email message, and/or a message displayed by one of the applications on the device 704. The message 1105 may provide an option 1110 for the user to view more details or to share his or her location with the user of the device 702.

Figure 12:
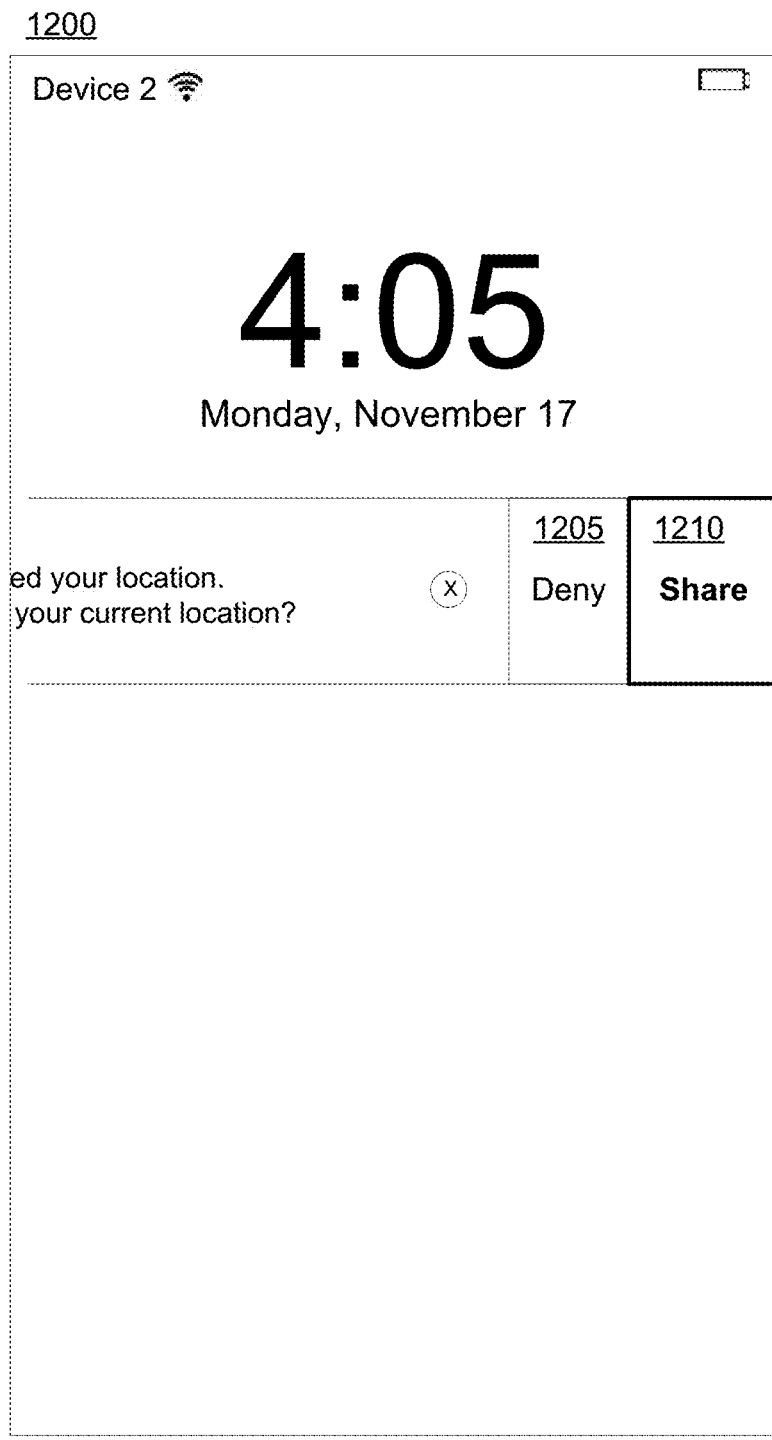
FIG. 12 illustrates an example display screen for sharing the location of a target in accordance with one or more illustrative aspects described herein.

FIG. 12 illustrates an example display screen 1200 for sharing the location of the target (e.g., the location of device 704) in accordance with one or more illustrative aspects described herein. The display screen 1200 may display an option 1205 to deny permission to share the device 704's location. The display screen 1200 may also display an option 1210 to grant permission to share the location. The options 1205 and 1210 may be displayed in the application 710 itself and/or a lock screen of the device 704. FIG. 12 illustrates the scenario where the user has selected the option to grant permission to share the location of device 704, as indicated by the highlighting of option 1210.

Returning to FIG. 8, in step 815, the device 702 and/or the device 704 may determine whether the user of the device 704 has granted permission to share the location of device 704 with the device 702. If, for example, the user of the device 704 decides not to share his or her location (e.g., by selecting the deny location sharing option 1205 in FIG. 12), the device 704, in step 830, may send a message to the device 702 indicating that the request has been denied. On the other hand, if the user of the device 704 selects the grant location sharing option 1210, the method may proceed to step 820.

In some aspects, the user of the device 704 may enable location sharing on the device 704. In these examples, the device 704 might not need to wait for the user to grant permission to share the location of device 704. Instead, the device 704 may automatically share its location with the device 702 in response to a request by the device 702 for the location of the device 704. In yet additional aspects, the device 704 may initiate location sharing with the device 702. For example, the user of device 704 may desire to invite the user of device 702 to his or her location. The device 704 may display an option for its user to share the location of the device 704 with the device 702, and the user of device 704 may select this option rather than waiting to receive a request for location sharing from the device 702.

In step 820, the device 704 may determine its location by communicating with one or more location sensors 708 at its location. The location sensor(s) 708 may notify the device 704 of its current location, such as a particular room or location in the building. In some aspects, the information sent by the location sensor(s) 708 to the device 704 may comprise an identifier for that room or location. For example, a location sensor in Conference Room 1 (a conference room) may use the name of the conference room (Conference Room 1) as the identifier. The location sensor may use any other alphanumeric identifier, such as Conf_R_1, AT7ZU3, or other identifier that distinguishes Conference Room 1 from other rooms or areas in the same building. The device 704 may receive a location identifier from one or several location sensors 708. All of the location sensors 708 at one location may have the same identifier (e.g., Conf_R_1) or each location sensor may have a different identifier (e.g., Conf_R_1_1 for the first location sensor, Conf_R_1_2 for the second location sensor, etc.). The device 704 may send the location information to the device 702 (or the application 710 of the device 702). In step 825, the device 702 may similarly determine its location (e.g., using one or more location sensors 708 as described above). As will be described below with reference to FIG. 19, the device 702 may send its location information and the location information for the device 704 to the map server 712 in order to navigate the device 702 to the location of the device 704.

Figure 13:
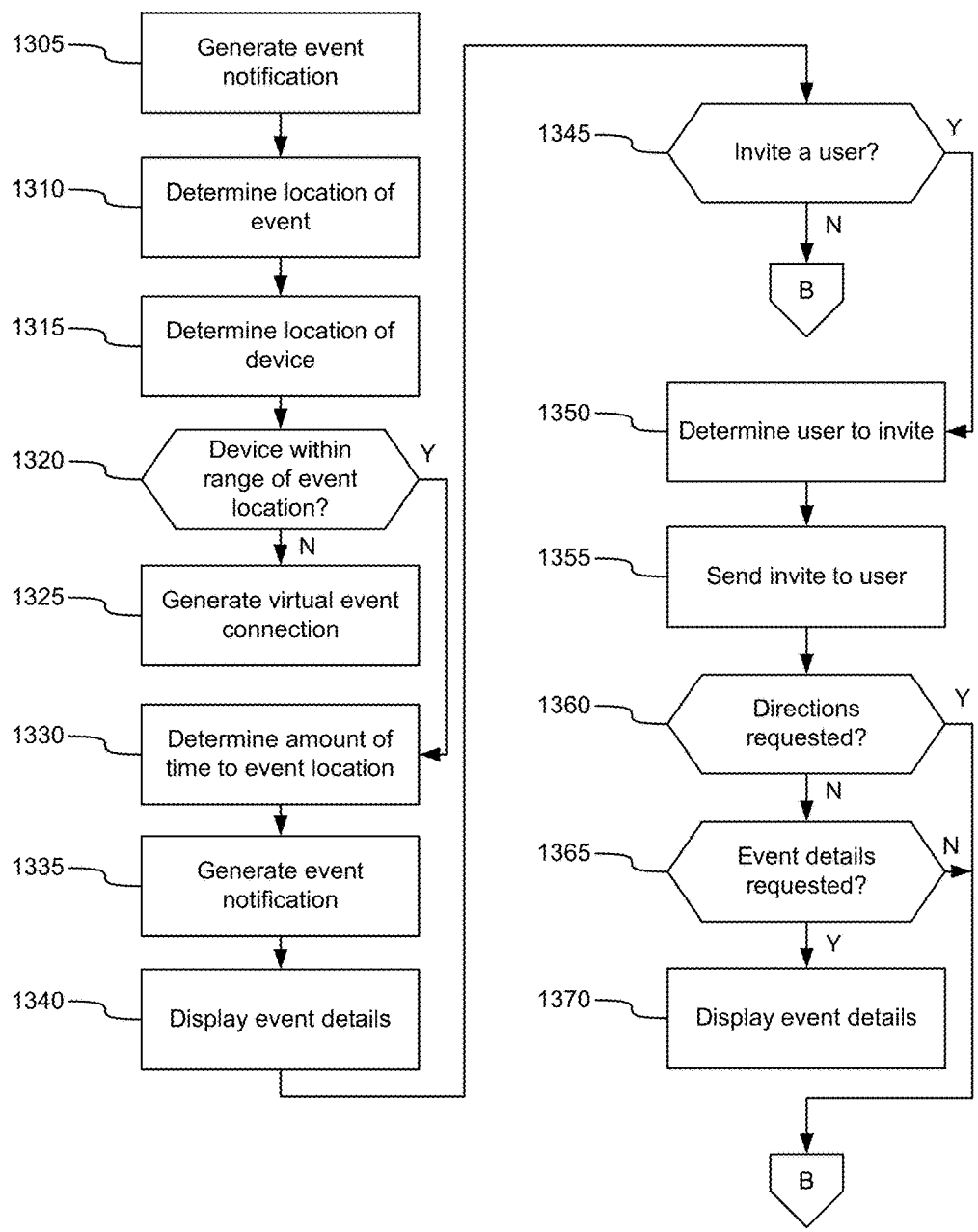
FIG. 13 illustrates an example method of determining the location of an event and generating a notification of the event in accordance with one or more illustrative aspects described herein.

FIG. 13 illustrates an example method of determining the location of an event and generating a notification of the event in accordance with one or more illustrative aspects described herein. In step 1305, the device 702 may optionally generate a notification for an event. FIG. 14 illustrates an example display screen 1400 for displaying an event notification 1405 in accordance with one or more illustrative aspects described herein. The device 702 may display the event notification 1405 a predetermined amount of time prior to the event (e.g., a Development Meeting), such as 15 minutes prior to the Development Meeting.

Returning to FIG. 13, in step 1310, the device 702 may determine the location of the event. For example, the event may be located at location 706 illustrated in FIG. 7. The location 706 of the event may be determined using one or more location sensor(s) 708 at the location 706. For example, a transmitting/receiving (TX/RX) device may be located at the location 706 and be in communication with the location sensors 708 at the location 706. The TX/RX device may comprise, for example, a laptop computer, a desktop computer, a tablet, a dedicated speakerphone, a display, a remote control for the display and/or the speakerphone, a camera, or any other device capable of wirelessly receiving location information from the location sensor(s) 708 at the location 706. Alternatively, the TX/RX device may be integrated with the location sensor(s) 708, and a separate TX/RX device might not be used. The TX/RX device may send the location information received from one or more location sensor(s) 708 to the device 702 (e.g., via the client application 710).

Additionally or alternatively, the device 702 may determine the location 706 of the event based on the event data field for the event in a calendar application on the device 702. FIG. 16 (which will be described later) illustrates an exemplary event data field 1605. For example, the device 702 may send the text in the event data field 1605 to a server storing event information, and the server may return the corresponding event based on the text information. Metadata included in the event invite or appointment may also identify the location of the event (e.g., based on a unique identifier for the location 706 and/or a location sensor 708 at the location 706, such as Conference Room 1, Conf_R_1, AT7ZU3, etc., as previously described). If location metadata is included in the event invite or appointment, the device 702 might not communicate with the server to determine the location of 706 of the event.

In step 1315, the device 702 may also determine its location using one or more location sensors 708 at its location. The device 702 determining its location may be similar to step 825 previously described.

In step 1320, the device 702 may determine whether it is within range of the event location 706. If the user of the device 702 is too far from (e.g., is outside the range of) the event location 706 (step 1320: N), the device 702, in step 1325, may initiate and/or generate a virtual connection to the event rather than navigate the user to the event because the user might not make it to the event on time. The device 702 may display dial-in details or other teleconference or Web connection details for the user to virtually connect to the event. If the user is not too far from (e.g., is inside the range of) the event location 706 (step 1320: Y), the device 702 may proceed to step 1330, as will be described below. In some aspects, the range may be predetermined, such as within the same building, within the same group of buildings (e.g., buildings owned or occupied by the same company), within the same city (e.g., both the device 702 and event are located in Santa Clara, Calif.), or within a predetermined distance from the event location 706 (e.g., 0.5 miles).

In some aspects, the range used by the device 702 may depend on the notification period displayed on the device 702 in step 1305. For example, assume that the device 702 displays a notification for the event 15 minutes prior to the start of the event, as illustrated in FIG. 14. The device 702 may determine how long it would take the user to walk to the event location 706. In some aspects, the device 702 may request this information from the map server 714, which as previously described, may store information identifying the amount of time between points in a building. If the time for the user to walk to the event location 706 does not exceed 15 minutes (step 1320: Y), the device 702 may proceed to step 1330 to navigate the device 702 to the event location 706. If the time for the user to walk to the event location 706 exceeds 15 minutes (step 1320: N), the device 702 may initiate and/or generate a virtual connection in step 1325.

Figure 15:
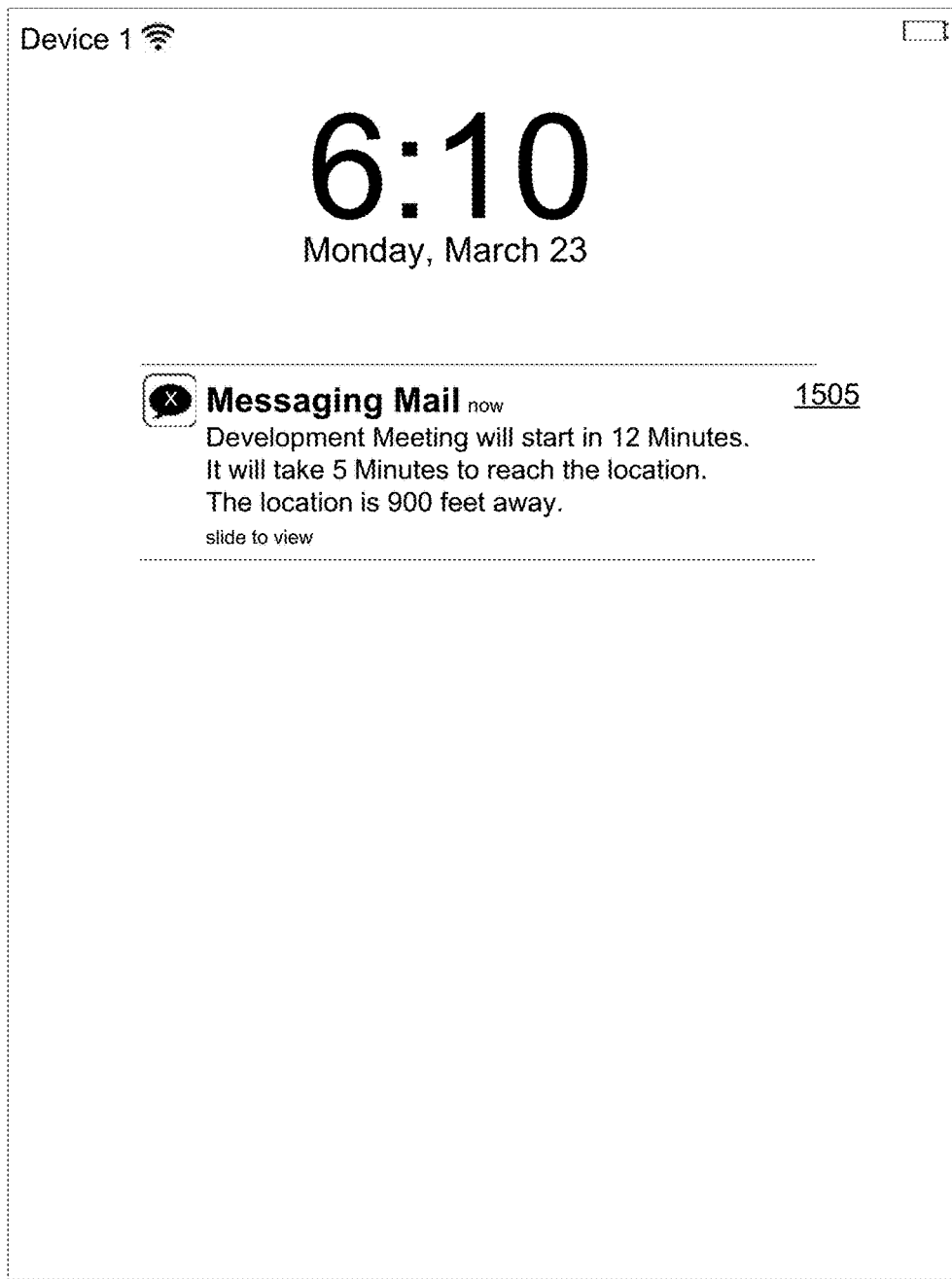
FIG. 15 illustrates another example display screen for displaying an event notification in accordance with one or more illustrative aspects described herein.

In step 1330, if the device 702 has not done so already, it may determine the amount of time it would take the user to walk from the location of the device 702 to the event location 706. In step 1335, the device 702 may generate an event notification. In some aspects, the event notification may comprise the notification 1405 illustrated in FIG. 14, identifying the event name (Development Meeting) and the amount of time until the event starts (15 minutes). Alternatively, the device 702 may generate the display screen shown in FIG. 15, which illustrates another example display screen 1500 for displaying an event notification 1505 in accordance with one or more illustrative aspects described herein. The notification 1505 additionally includes the estimated amount of time for the user of the device 702 to walk from his or her current location to the event location 706 (e.g., 5 minutes). Accordingly, the user is notified when the user should start walking to the event at the latest (e.g., in 7 minutes or at 6:17). The notification 1505 may additionally include the distance to the event location 706 (e.g., 900 feet).

The notification 1505 may be periodically updated, such as every minute, and displayed on the device 702. The updated notification may include an updated amount of time and an updated distance to the event location 706, such as if the user has moved the device 702. The device 702 may determine the updated amount of time and updated distance in the manner previously described.

In some aspects, the notification server 714 may push the event notifications 1405 and/or 1505 to the device 702. The notification server 714 may communicate with the map server 712 to determine the amount of time and/or the distance from the device 702 to the event location 706, similar to the communication between the device 702 and the map server 712 previously described. The notification server 714 may periodically push the event notification to the device 702 (and any other devices invited to the event), such as every minute. The updated notification may comprise the updated time and/or updated amount of time to reach the event location 706.

Returning to FIG. 13, in step 1340, the device 702 may display details of the event. For example, the device 702 may display event details if the user slides the notification 1405 illustrated in FIG. 14, the notification 1505 illustrated in FIG. 15, or otherwise requests event details from the device 702.

FIG. 16 illustrates an example display screen 1600 for displaying details for an event in accordance with one or more illustrative aspects described herein. The event details may include an event location field 1605, which may identify Conference Room 1 as the location of the Development Meeting. The event details may also include an event time field 1610, which may be Monday, Nov. 17, 2020 from 11 AM to 11:30 AM. The event details may also include an organizer field 1615, which indicates Jane Doe as the organizer of the Development Meeting. If there are more organizers, the user may select the organizer field 1615 (or the arrow included therein) to view a list of the additional organizers. The event details may also include an attendees field 1620, which indicates that 8 people plan to attend the Development Meeting. The user may select the attendees field 1620 (or an arrow included therein) to view a list of the attendees. Additional details for the event may be displayed in data field 1625.

The display screen 1600 may also include an option 1630 to navigate the user of the device 702 from his or her current location to the event location 706. Selecting this option may cause the device 702 to display directions instructing the user how to get to the event location 706, as will be described below.

The display screen 1600 may include an option 1635 for the user of the device 702 to invite another person to the event, such as a user of the device 704. Selecting the option 1635 may cause the device 702 to display the example display screen 1700 illustrated in FIG. 17 for inviting another user to an event or a particular location, such as the device 702's location, in accordance with one or more illustrative aspects described herein. In particular, a list of the user's contacts may be displayed in the display screen 1700. The user may select one of his or her contacts, such as Colleague 1, and select the invite option 1705 to invite colleague 1 to the event or to the location of the device 702.

Figure 17:
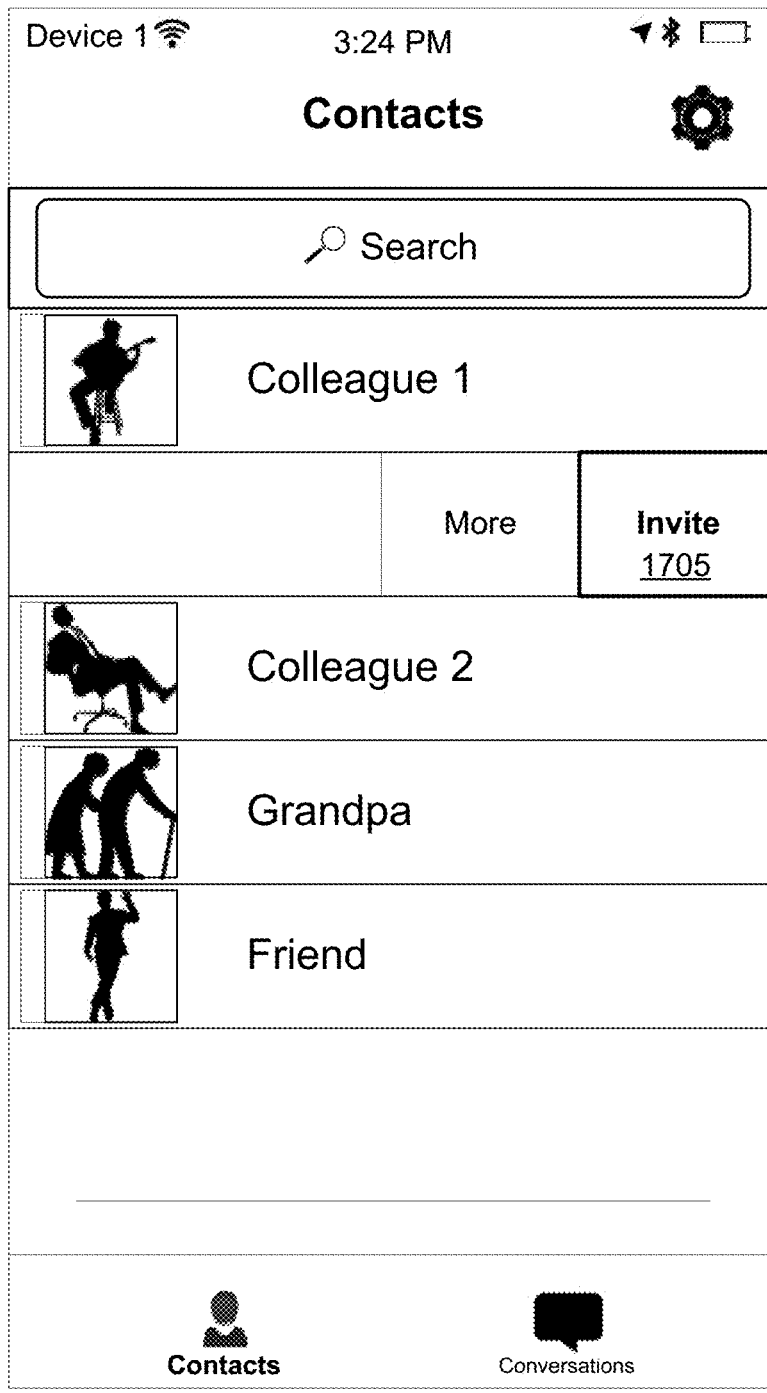
FIG. 17 illustrates an example display screen for inviting a user to an event or a particular location in accordance with one or more illustrative aspects described herein.

Returning to FIG. 13, in step 1345, the device 702 may determine whether to invite another user to the event (e.g., if the user selected the invite option 1705 illustrated in FIG. 17 or the invite option 1635 illustrated in FIG. 16). If not (step 1345: N), the device 702 may proceed to navigate the user to the event location 706, as will be described below with reference to FIG. 19. If the user selects the option to invite another user (step 1345: Y), the device 702 may determine the other user to invite in step 1350 (e.g., Colleague 1 as illustrated in FIG. 17).

Figure 18:
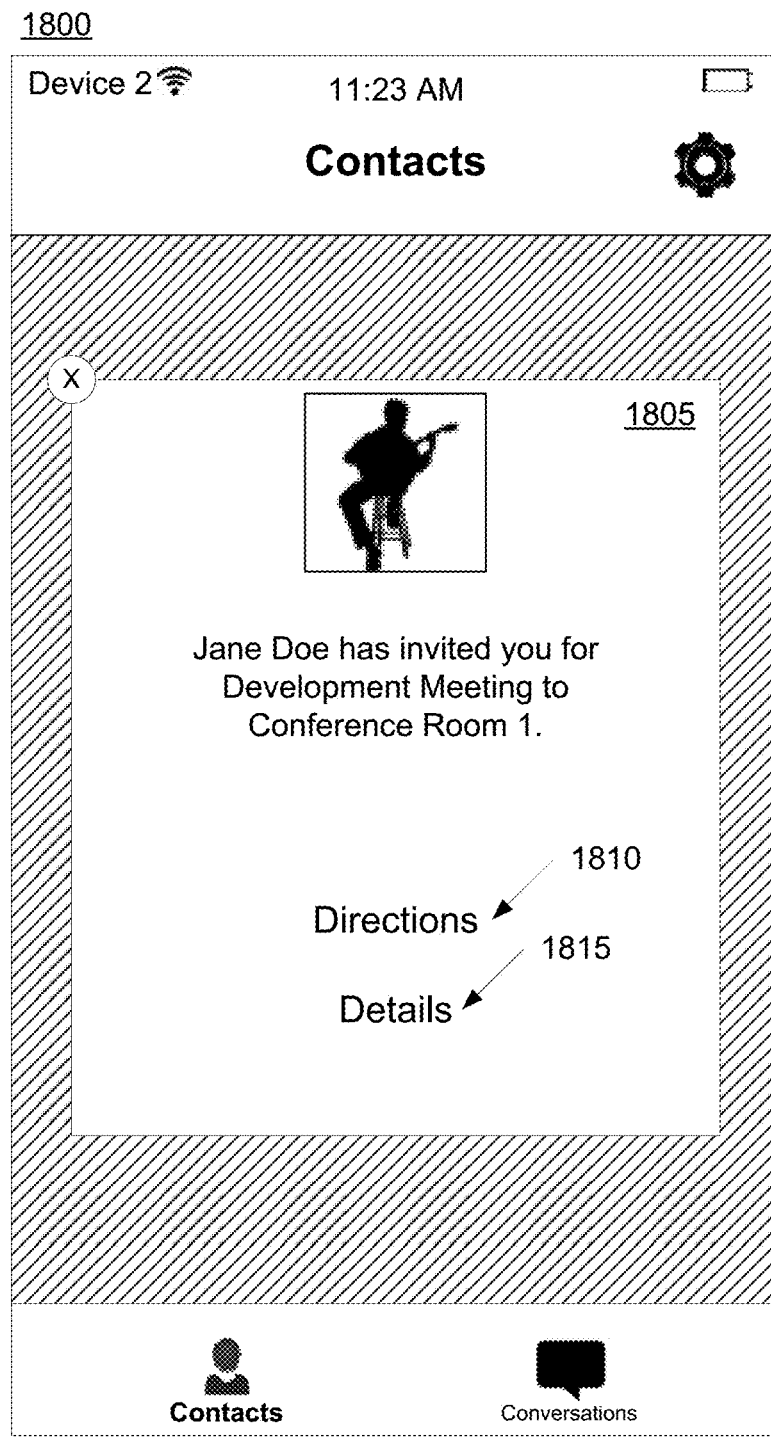
FIG. 18 illustrates an example display screen for receiving an invitation to an event or a particular location in accordance with one or more illustrative aspects described herein.

In step 1355, the device 702 may send the invite to the selected user. In some aspects, the device 702 may send a request to the notification server 714 to send an invite notification to the device 704. FIG. 18 illustrates an example display screen 1800 for the device 704 receiving an invitation 1805 to an event or a particular location in accordance with one or more illustrative aspects described herein. The invitation 1805 may identify the inviter (e.g., Jane Doe), the event (e.g., Development Meeting), and/or the event location 706 (e.g., Conference Room 1). The invitation 1805 may display an option 1810 to direct the invited user to the event location 706. The invitation 1805 may also display an option 1815 that allows the invited user to view details of the event. One or more of the pieces of information illustrated in FIG. 16 may be displayed on the device 704 if the user selects the details option 1815.

Returning to FIG. 13, in step 1360, the device 704 may determine whether the user of the device 704 has requested directions to the event location 706, such as by selecting the option 1810. If so (step 1360: Y), the device 704 may proceed to the navigation steps illustrated in FIG. 19 described below. If not (step 1360: N), the device 704, in step 1365, may determine whether the user of the device 704 has requested to view event details, such as by selecting an option 1815. If so (step 1365: Y), the device 704 may display the details of the event in step 1370, which may be similar to the details illustrated in FIG. 16. If not (step 1365: N), the device 704 may optionally proceed to the navigation steps illustrated in FIG. 19, such as, after a predetermined amount of time. Alternatively, the device 704 may end the process for the device 704 because the user of the device did not accept the invitation.

Figure 19:
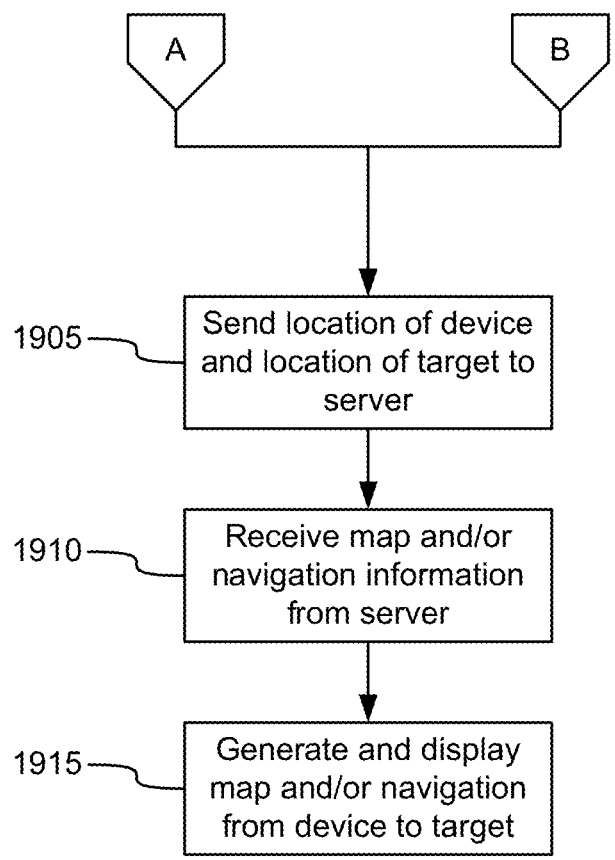
FIG. 19 illustrates an example method of generating a map and/or navigating a user to a target location in accordance with one or more illustrative aspects described herein.

FIG. 19 illustrates an example method of generating a map and/or navigation route to a target location, such as another device 704 or an event location 706, in accordance with one or more illustrative aspects described herein. The steps illustrated in FIG. 19 may be performed to navigate the user of the device 702 to the location of the device 704 (or vice versa), to navigate the user of device 702 to an event location 706, and/or to navigate the user of device 704 to the event location 706.

In step 1905, the device 702 may send its location and the location of the target (e.g., the location of device 704 or the event location 706) to the map server 712. The map server 712 may retrieve the appropriate navigation information used to navigate the device 702 to the target location. For example, the server 712 may retrieve a floor layout for the building. If the device 702 and the target are located on different floors, the server 712 may retrieve the floor layout for each of those floors. The server 712 may also retrieve information identifying the distance between the device 702 and the target location, including distances for each segment of the route. The server 712 may also retrieve information identifying the amount of time it will take the user to walk from his or her current location to the target location, including the amount of time for each segment of the route.

In step 1910, the server 712 may send the information to the device 702 (or the device 704 if the device 704 requested it). In step 1915, the device 702 (or the device 704) may generate a map and/or navigation route to the target location using the information received from the server 712. Alternatively, the server 712 may generate the map and/or navigation route and send it to the device 702 (or the device 704), and the device 702 (or the device 704) may display the map and/or navigation route to the user.

Figure 20:
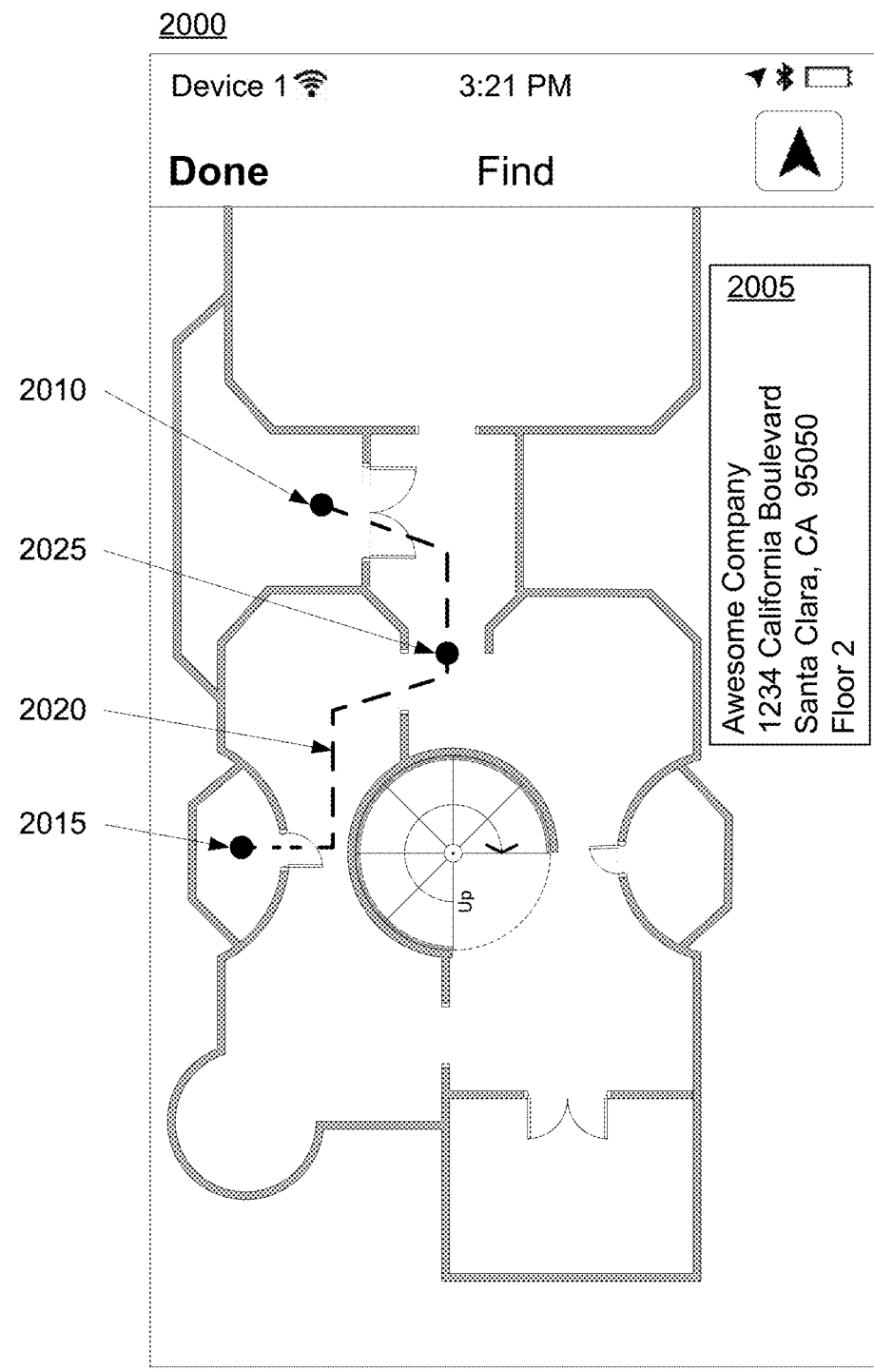
FIG. 20 illustrates an example display screen for navigating a user to a target location in accordance with one or more illustrative aspects described herein.

FIG. 20 illustrates an example display screen 2000 for navigating a user to a target location 2015 in accordance with one or more illustrative aspects described herein. The display screen 2000 may display the building location and/or floor number 2005 for the displayed map. The display screen 2000 may display the location 2010 of the device 702 (or the device 704) and the location 2015 of the target (e.g., the event location 706 or the location of the device 704). The display screen 2000 may also display a navigation route 2020 for navigating the user to the target location 2015. The display screen 2000 may optionally display the user's progress 2025 to the target location 2015.

Figure 21:
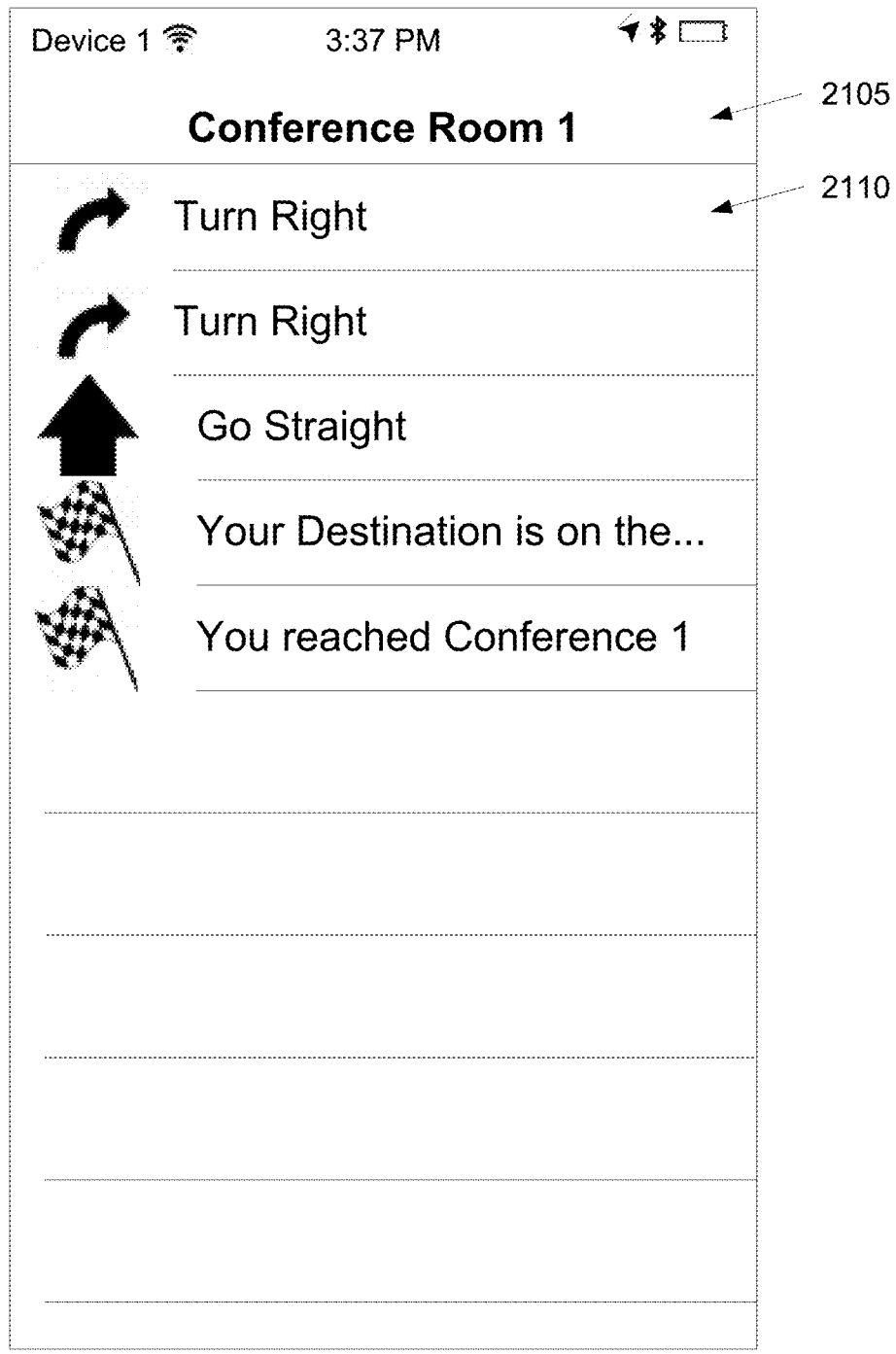
FIG. 21 illustrates another example display screen for navigating a user to a target location in accordance with one or more illustrative aspects described herein.

FIG. 21 illustrates another example display screen 2100 for navigating the user to the target location in accordance with one or more illustrative aspects described herein. The display screen 2100 may identify the target location 2105 (e.g., Conference Room 1). The display screen 2100 may also provide turn-by-turn directions 2110 for navigating the user to the target location 2105.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    receiving, at a user device, an invitation from a second user device for a user of the user device to go to a location of a target within a building;
    displaying, at the user device, the invitation, including an option to select the target within the building;
    sending, by the user device, a request for the location of the second user device;
    receiving, from the second user device, an authorization message to share the location of the second user device;
    in response to receiving the authorization message to share the location of the second user device, receiving, at the user device, a selection of the option to select the target within the building;
    determining the location of the target within the building from among a plurality of discrete locations within the building;
    determining, based on one or more location sensors, a location of the user device within the building;
    determining a navigation path within the building from the location of the user device to the location of the target; and
    generating, on a map of the building, a display of the navigation path within the building from the location of the user device to the location of the target for display on the user device.

2. The method of claim 1, wherein determining the location of the target within the building is based on one or more second location sensors.

3. The method of claim 1, wherein the target comprises an event, and wherein determining the location of the event comprises:
    accessing a calendar service comprising information for the event; and
    determining, as the location of the event, a location identified in the information for the event.

4. The method of claim 1, wherein the target comprises an event, the method further comprising:
    prior to receiving the selection of the option to select the event, receiving, at the user device, a notification of the event, wherein the notification is received a predetermined amount of time prior to a start time of the event; and
    displaying, at the user device, the notification of the event, including an option to select the event.

5. The method of claim 1, wherein the target comprises a second user of the second user device.

6. The method of claim 1. wherein the one or more location sensors comprise one or more Bluetooth sensors or Near Field Communication sensors.

7. The method of claim 1, further comprising generating a display of turn-by-turn directions within the building from the location of the user device to the location of the target for display on the user device.

8. The method of claim 1, wherein generating, on the map of the building, the display of the navigation path comprises overlaying the navigation path on the map of the building.

9. The method of claim 1, wherein generating, on the map of the building, the display of the navigation path comprises generating, on the map of the building, a display of:
    one or more display screen elements indicating the location of the user device within the building,
    one or more display screen elements indicating the location of the target within the building, and one or more display screen elements indicating the navigation path within the building from the location of the user device to the location of the target.

10. The method of claim 1, wherein determining the location of the target comprises determining the location of the target based on a communication between one or more second location sensors and a computing device located proximate to the one or more second location sensors.

11. The method of claim 1, wherein the target comprises an event, the method further comprising:
generating, for display at the user device, a notification indicating a start time for the event and indicating an amount of time to move from the location of the user device to the location of the event.

12. An apparatus comprising:
a display;
a processor; and
memory storing computer-executable instructions that, when executed by the processor, cause the apparatus to:
receive an invitation from a second apparatus for a user of the apparatus to go to a location of a target within a building;
display, on the display of the apparatus, the invitation, including an option to select the target within the building;
send a request for the location of the second apparatus;
receive, from the second apparatus, an authorization message to share the location of the second apparatus;
in response to receiving the authorization message to share the location of the second apparatus, receive a selection of the option to select the target within the building;
determine the location of the target within the building, from among a plurality of discrete locations within the building;
determine, based on one or more location sensors, a location of the apparatus within the building;
determine a navigation path within the building from the location of the apparatus to the location of the target; and
generate, on a map of the building, a display of the navigation path within the building from the location of the apparatus to the location of the target for display on the display of the apparatus.

13. The apparatus of claim 12, wherein the target comprises an event, and wherein determining the location of the event comprises:
accessing a calendar service comprising information for the event; and
determining, as the location of the event, a location identified in the information for the event.

14. The apparatus of claim 12, wherein:
the target comprises a second user of the second apparatus,
the location of the target comprises a location of the second apparatus, and
determining the location of the target comprises determining the location of the second apparatus.

15. The apparatus of claim 12, wherein:
the target comprises an event,
the location of the target comprises the location of the event, and
determining the location of the event comprises:
accessing a calendar service comprising information for the event; and
determining, as the location of the event, a location identified in the information for the event.

16. The apparatus of claim 12, wherein the target comprises a second user of the second apparatus.

17. A non-transitory computer-readable media storing computer-readable instructions that, when executed by a computing device, cause the computing device to:
receive an invitation from a second computing device for a user of the computing device to go to a location of a target within a building;
display the invitation, including an option to select the target within the building;
send a request for the location of the second computing device;
receive, from the second computing device, an authorization message to share the location of the second computing device;
in response to receiving the authorization message to share the location of the second computing device, receive a selection of the option to select the target within the building;
determine the location of the target within the building from among a plurality of discrete locations within the building;
determine, based on one or more location sensors, a location of the computing device within the building;
determine a navigation path within the building from the location of the computing device to the location of the target; and
generate, on a map of the building, a display of the navigation path within the building from the location of the computing device to the location of the target for display at the computing device.

18. The non-transitory computer-readable media of claim 17, wherein the target comprises an event, the media storing computer-readable instructions that, when executed by the computing device, cause the computing device to:
prior to receiving the selection of the option to select the event, receive a notification of the event, wherein the notification is received a predetermined amount of time prior to a start time of the event; and
display, at the computing device, the notification of the event, including an option to select the event.

19. The non-transitory computer-readable media of claim 17, wherein the target comprises a second user of the second computing device.

* * * * *